Inventor
Joseph E. Batie

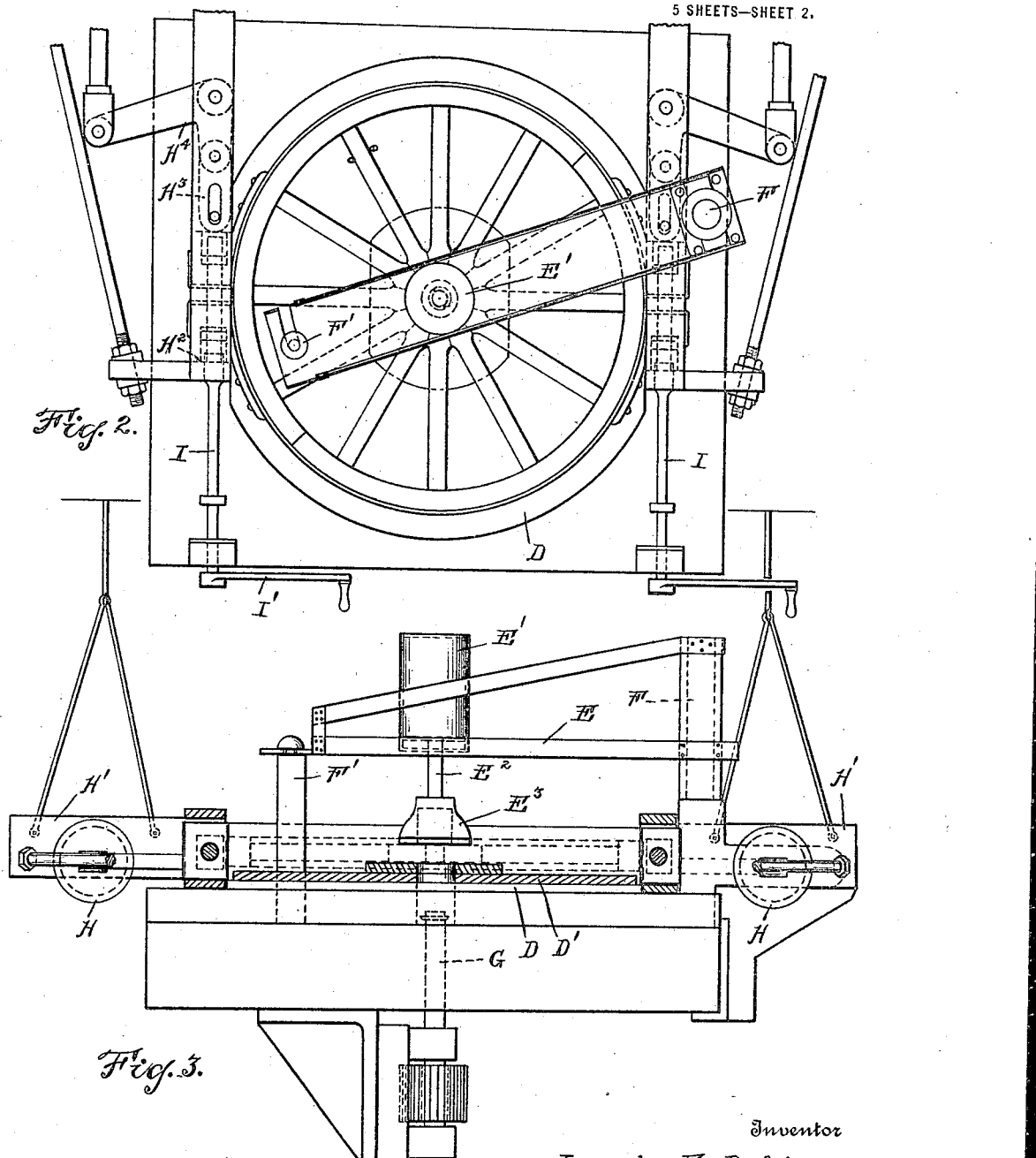

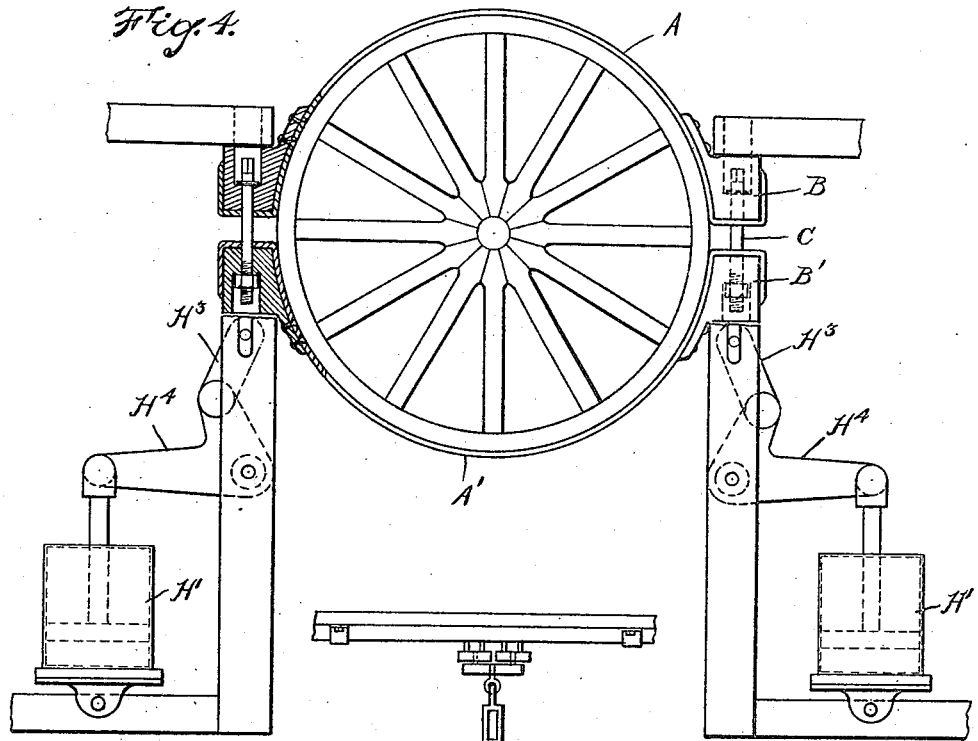
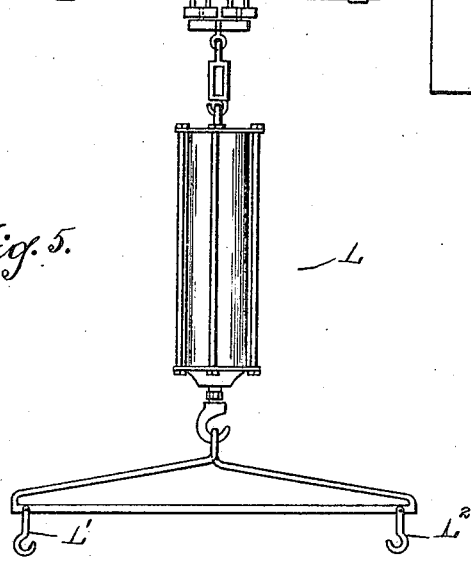

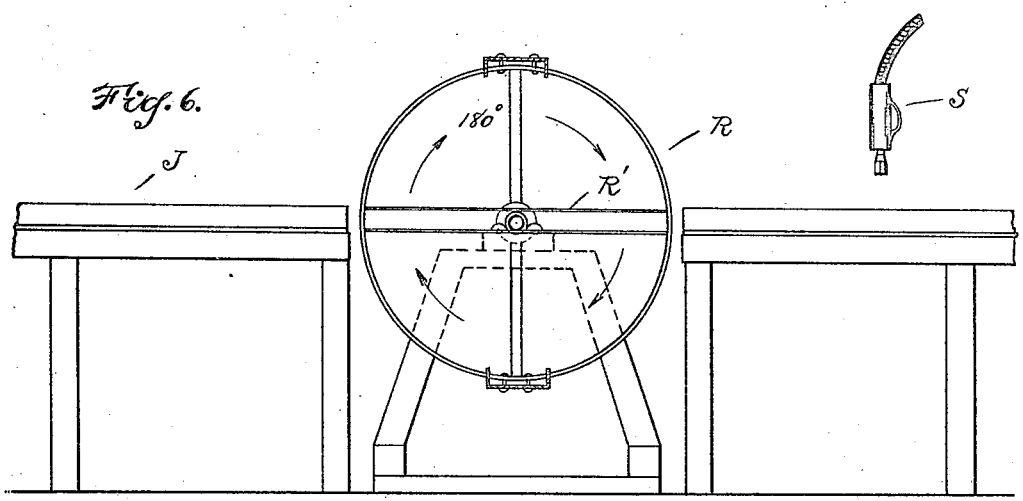
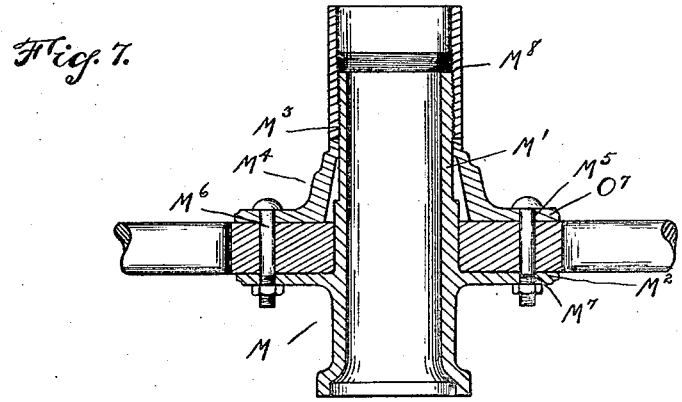

J. E. BATIE.
APPARATUS FOR MANUFACTURING VEHICLE WHEELS.
APPLICATION FILED OCT. 28, 1918.
1,416,678.
Patented May 23, 1922.
5 SHEETS—SHEET 5.
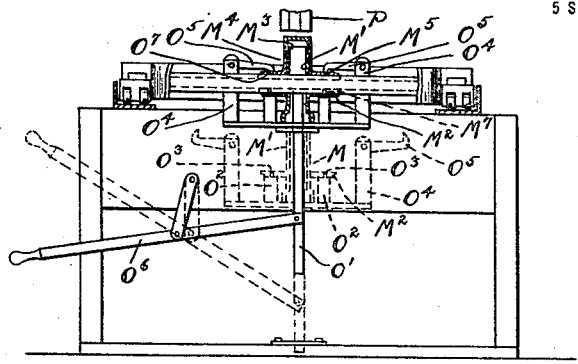
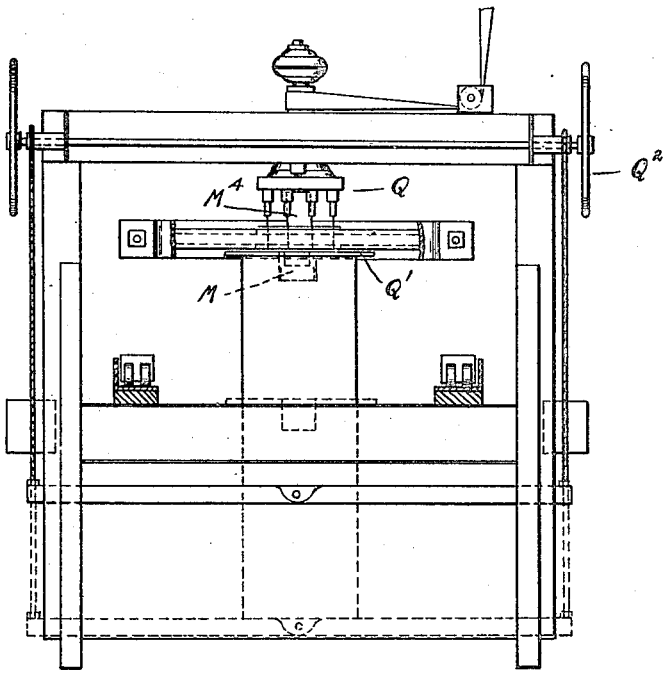
Inventor
Joseph E. Batie
By Whittemore, Hulbert & Whittemore
Attorneys

UNITED STATES PATENT OFFICE.

JOSEPH E. BATIE, OF DETROIT, MICHIGAN, ASSIGNOR TO KELSEY WHEEL COMPANY, INC., OF DETROIT, MICHIGAN, A CORPORATION OF NEW YORK.

APPARATUS FOR MANUFACTURING VEHICLE WHEELS.

1,416,678.

Specification of Letters Patent. Patented May 23, 1922.

Application filed October 28, 1918. Serial No. 259,906.

*To all whom it may concern:*

Be it known that I, JOSEPH E. BATIE, a citizen of the United States of America, residing at Detroit, in the county of Wayne and State of Michigan, have invented certain new and useful Improvements in Apparatus for Manufacturing Vehicle Wheels, of which the following is a specification, reference being had therein to the accompanying drawings.

The invention relates to the manufacture of vehicle wheels and more particularly to that type used in connection with ordnance and comprising wooden spokes and felly, a metallic rim and a metallic hub.

It is the object of the invention to facilitate and expedite the manufacture by performing the successive operations incident to the assembly of the parts of the wheel at different locations, also to provide instrumentalities at the several locations for the performance of these operations and to provide means for easily transporting the work from one location to another. Still another object of the invention is to provide means for temporarily clamping the complementary portions of the wheel and to maintain same in clamped relation while transported from one place to another. The invention therefore comprises the novel construction, arrangement and combination of instrumentalities as hereinafter set forth.

In the drawings:

Figure 2 is a plan view of the machine for peripherally clamping the work and for boring for the hub;

Figure 3 is a cross-section through Figure 2;

Figure 4 is a sectional plan illustrating the operation of clamping the work;

Figure 5 is an elevation of the hoist for transferring the work;

Figure 6 is a sectional side elevation showing the reversing mechanism;

Figure 7 is a section through the clamped work showing the manner of engaging the hub;

Figure 8 is a cross-section on line 8—8 of Figure 1;

Figure 9 is a cross-section on line 9—9 of Figure 1.

Figure 1:
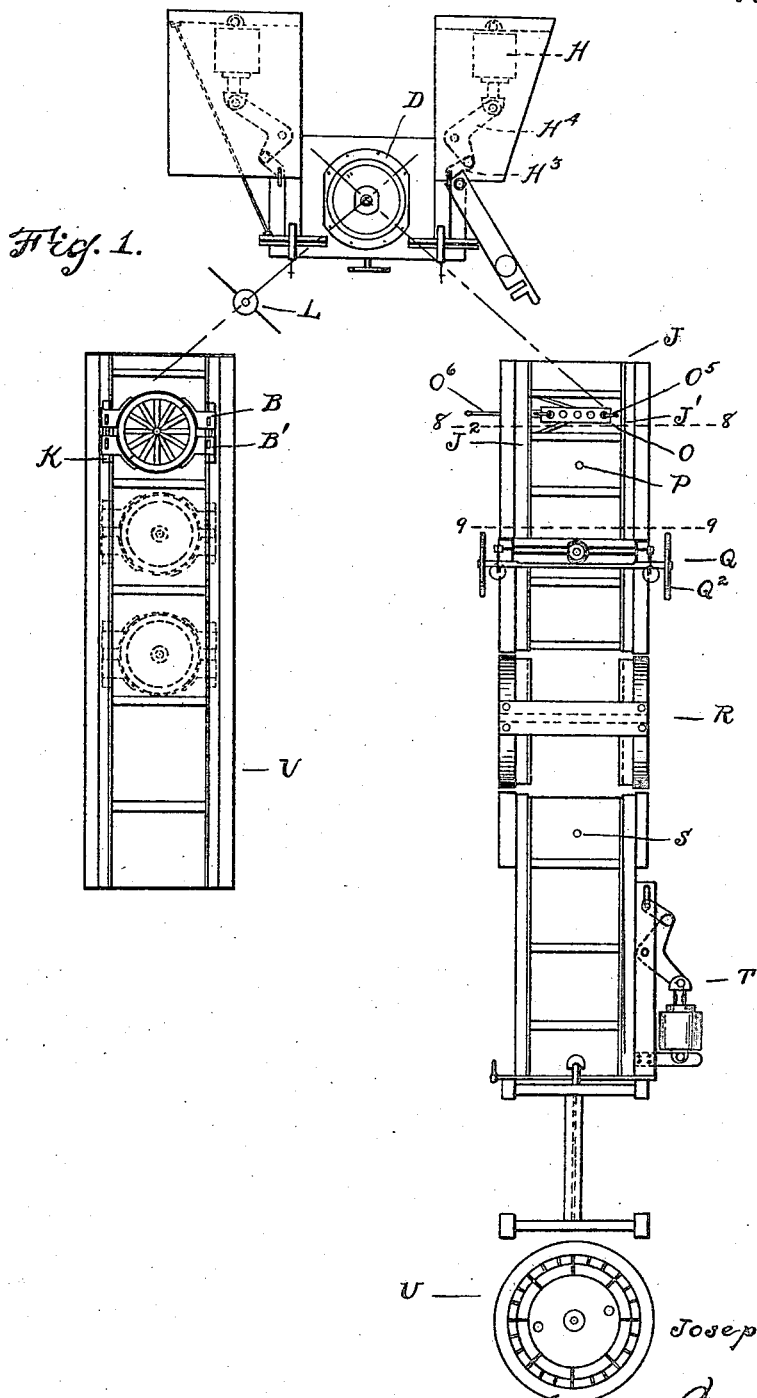
Figure 1 is a diagrammatic plan view of the apparatus.

In the present state of the art, wheels of the character described have been formed by first placing temporary spoked felly sections in the press by which circumferential and radially inward pressure is applied to the felly sections and spokes and while thus pressed performing the operations of boring, mounting the hub and securing same. As there are a number of distinct operations necessary it is obvious that the press must remain idle during the time interval for the performance of these operations and, moreover, all of the operations must be performed by one set of workmen. One of the principal features of my improvement is in the substitution for the press as a holding means for the work of portable clamps which may be successfully engaged with assembled wheels and will retain the same under compression when released from the press. This permits of advancing the work to the different stations where the operations may be performed thereon successively and by different workmen, thereby reducing the time and increasing the output. Moreover, the workmen do not need to be highly specialized, as each performs a particular operation, many of which require but slight skill.

The temporary work clamps forming a part of my apparatus preferably consist of complementary segments A and A' which together embrace the periphery of the assembled felly sections and which are provided with projecting lugs or brackets B and B' secured to each other by clamping screws C. The work is engaged with the clamp when the screws C are loosened and pressure is then applied by drawing the lugs B, B' towards each other. This is preferably accomplished in a power jack and, as shown, the power is furnished by pneumatic motors.

It is essential to maintain the circular form of the wheel during compression and also to exactly center the felly during the boring of the inner ends of the spokes for receiving the hub. I, therefore, provide as a part of my apparatus a table D on which the work is first placed after engagement with the temporary clamp, which table has a circular guide D' for loosely fitting within the projecting edge of the clamping band. Mounted above the table at one side of the guide D is a pivoted arm E which is secured to an upright post F and is adapted to be swung over the work on the table and to engage with its free end a second post F'. When thus engaged the arm will pass over the center of the work, and at the center point is arranged a pneumatic cylinder E' having a depending plunger E² with a clamping head E³ at its lower edge for bearing against the inner ends of the spokes. The head E³ when under the pressure of the cylinder E' will clamp the inner ends of the spokes firmly upon the table and will hold them from springing out of place; radial pressure is then applied as hereinafter set forth. There is also arranged beneath the table a boring spindle G which is vertically movable upward through a central aperture in the table and is exactly concentric with the guide D'.

After applying the radial compression to the work, the lugs B and B' are drawn towards each other, this being accomplished by floating jacks comprising pneumatic motors H mounted on swinging frames H'. These frames, as shown, are substantially triangular in form, being provided at one end with a stationary clamping jaw H² and a movable jaw H³ actuated by a toggle lever H⁴ which in turn is actuated by the piston in the cylinder H. The arrangement is such that the frame H' may be moved so that the stationary and movable jaws H² and H³ embrace the lugs B and B' and by then applying the pneumatic pressure these jaws are forced towards each other. These in turn will draw upon the segments A and A' and will apply the uniform radial pressure against the felly sections and spokes. When sufficiently compressed the clamping bolts C may be tightened by suitable means, such as a wrench I, mounted on the frame and operated by a crank arm I'. The clamping is effected simultaneously upon diametrically opposite sides of the work and as the clamping bands A and A' are guided by the circular guides D' the work will be held concentric with the boring spindle.

Adjacent to the table B is a track or runway over which the clamped wheels may be transported from one point of operation to another. As shown, this runway J is a frame having parallel side rails J' and J², preferably of angle sections and adapted to receive the projecting lugs B and B' of the work clamps. Work truck members K are provided, these being adapted for engagement with the lugs B and B' so that the clamps are supported by the trucks while traveling over the rails J' and J². For removing the work from the table D and placing it on the runway a suitable hoist, such as L, is provided, this being provided with hooks L' and L² for engaging the work clamps on diametrically opposite sides.

The first operation to be performed upon the work while on the runway J is the pressing of one of the hub sections through the bore in the spokes. This hub section M has a cylindrical body M', a flange M² for bearing against one side of the spoke and a threaded portion M³ for engaging the hub cap on the opposite side of the spokes. There is also provided a complementary hub section M⁴ for fitting over the portion M' and having a flange M⁵ arranged upon opposite sides of the spokes of the flange M². The flanges M⁵ and M² are secured to each other by bolts M⁶ which pass through the registering apertures in said flanges and through the bores in the spokes. It is, therefore, necessary in engaging the hub sections to register the apertures in the flanges M² and M⁵ with each other and to so locate them that they will register with the boring means for boring the spokes, which is accomplished as follows:

O is a holder arranged beneath the work on the structure J, J' and J² having a central spindle O' for registering with the bore in the spokes and for centering the hub section M. Upon opposite sides of the spindle O' are the supports O² having projecting pins O³ for engaging apertures M⁷ in the flange M². O⁴ are vertically extending pins or posts on opposite sides of the holder O which pass between the spokes of the wheel and are provided with hinged fingers O⁵ for engaging with apertures in the flange M⁵. The holder O may be moved upward by a lever O⁶ carrying with it the hub section M and forcing the same through the aperture in the spokes, or thus when the work is located at the first position upon the runway J the hub section M is forced upward through the bore in the spokes, after which the section M⁴ is engaged therewith and registered by turning down the fingers O⁵ to engage the aperture O⁷. The apertures are then held in this position by screwing on to the threaded portion M² a clamping nut M⁸ which will apply sufficient pressure to prevent shifting in position. The screwing on of the nut and clamping the same is expedited by arranging a pneumatic wrench or nut tightener P above the runway, this being preferably suspended in a position for convenient manipulation.

The next operation to be performed upon the work is the boring of the spokes in registration with the bolt apertures in the flanges M² and M⁵. These flanges being exactly positioned upon the work as before described, it is only necessary to arrange a multiple spindle control Q above the runway, together with means for raising the work clamp when properly registered with said spindles. As shown, the work clamp is raised upon a vertically movable head Q' which may be actuated by the hand wheel Q², or if desired by power means. As the work is raised the drills will pass through the apertures in the flange M⁵ and will bore through the spokes into the apertures in the flange M² without contact with the metallic surface. There is a station upon the runway at which the clamping bolts are inserted through the apertures O⁷ in the flange M⁵ and are driven through the bored holes in the spokes and registering apertures in the flange M². The work is then reversed which is accomplished upon a turn table R having channel guides R' for receiving the lugs B and B'. Before engagement with such channels R', a second pair of trucks K are placed in reversed position upon said lugs so that when the work is reversed it will be supported upon these last mentioned trucks. The turn table may be actuated by hand and the work when reversed is moved or rolled over the runway to a station where nuts are engaged with the threaded ends of the hub bolts and are tightened preferably with the assistance of a power wrench S. When this operation is completed, the peripheral clamps may be removed which is accomplished by a pneumatic jack T forcing the lugs B and B' toward each other while the screw C is loosened. This jack may be of the same construction as those first used for engaging the clamps. The work when released from the clamp passes on to the tire setting press where a heated metallic tire is first placed around the felly and then radially compressed as indicated at U. The released clamps are returned on the runway V and when in a position adjacent to the table D complementary spoked felly sections are then engaged therewith and the operation repeated.

From the description above given, it will be obvious that the several operations may be quickly and easily performed without delaying of one by another or interference between the workmen performing their respective tasks. Also the usual radial press for the initial compression of the work is dispensed with and the compression effected by the clamping bands assisted by the pneumatic jacks.

What I claim as my invention is:—

1. In an apparatus for assembling wheels, the combination with a support for complementary spoked felly sections, means for yieldably clamping the inner ends of the spokes to hold them in the same plane, a peripheral clamping band for surrounding the complementary sections, a floating jack for drawing the ends of said band toward each other to circumferentially and radially compress the work, means for guiding the work and holding the periphery thereof in substantially circular form, and boring means for the hub concentric with said guiding means.

2. An apparatus for assembling wheels, comprising a series of portable peripheral clamps for complementary spoked felly sections, means for applying power to circumferentially and radially compress said complementary sections while in engagement with the peripheral clamp, a track along which the clamped sections are advanced, a plurality of devices along said track for performing upon the clamped work successive operations incident to the mounting of a hub, and power means for releasing said clamps after the hub securing operations permitting the return of the same.

3. An apparatus for assembling wheels, comprising a series of peripheral clamps for complementary spoked felly sections, power means for circumferentially and radially compressing said sections while in engagement with the peripheral clamp, a track along which said clamped sections are successively advanced, a plurality of devices along said track for performing on the clamped work the successive operations incident to the mounting of a hub, including boring for the hub barrel, engaging registered hub sections, boring for the hub clamping bolts, reversing mechanism, and means for releasing the clamps.

In testimony whereof I affix my signature.

JOSEPH E. BATIE.